G. S. BILLMAN.
MACHINE FOR CLEANING INTESTINES.
APPLICATION FILED OCT. 8, 1910.
997,738.
Patented July 11, 1911.
3 SHEETS—SHEET 1.
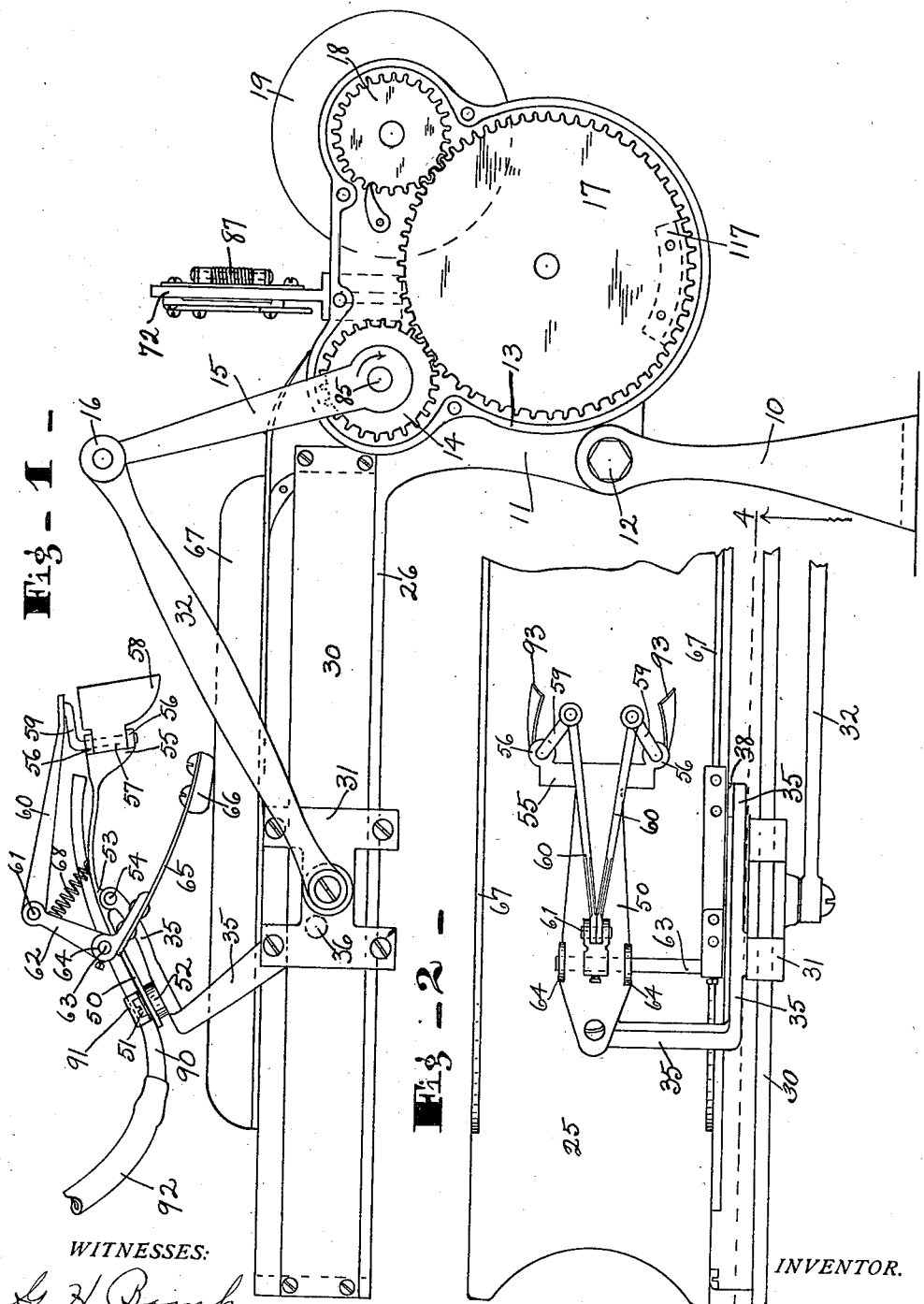
WITNESSES:
INVENTOR.
BY Gustus S. Billman
ATTORNEY.

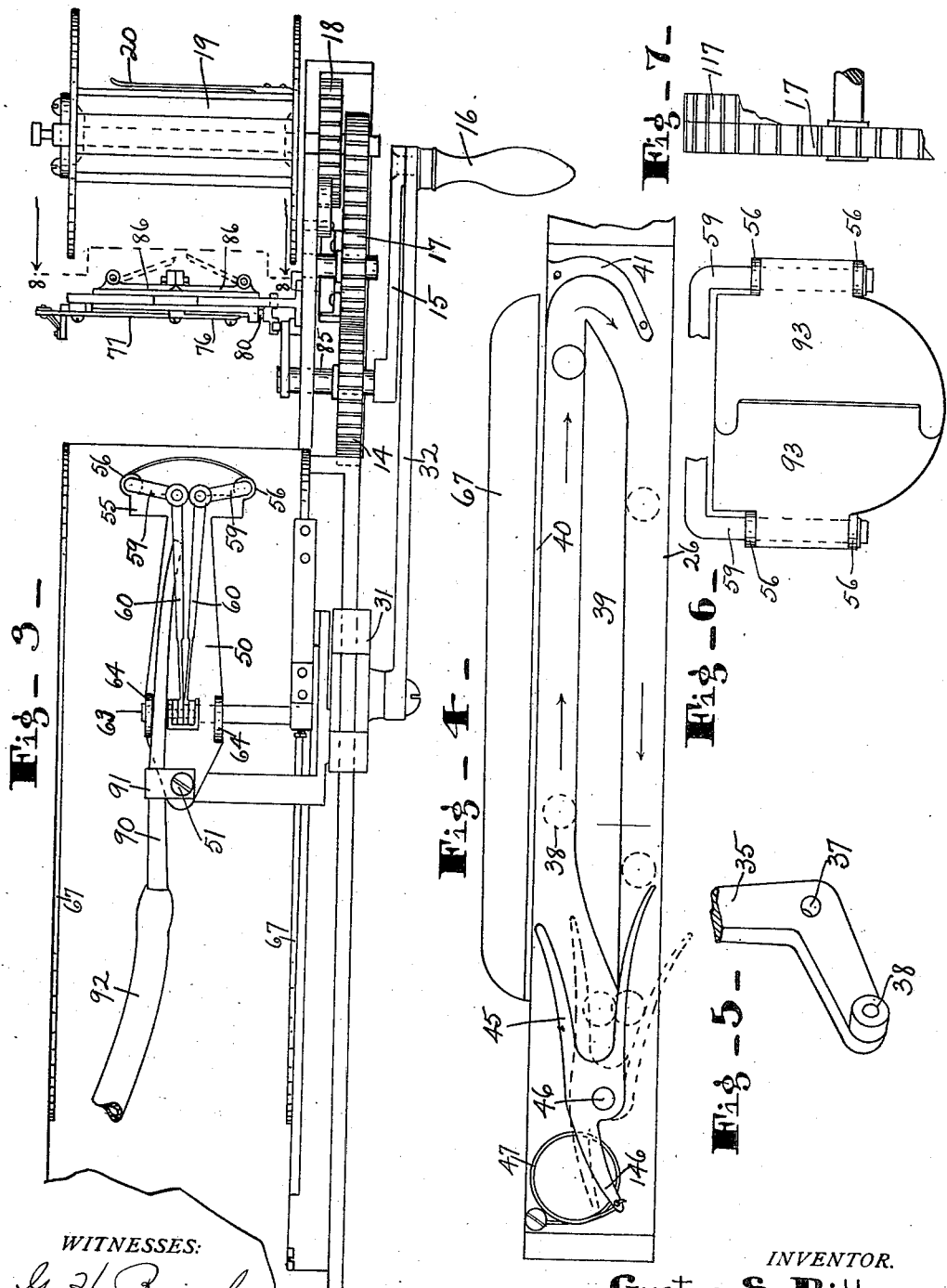

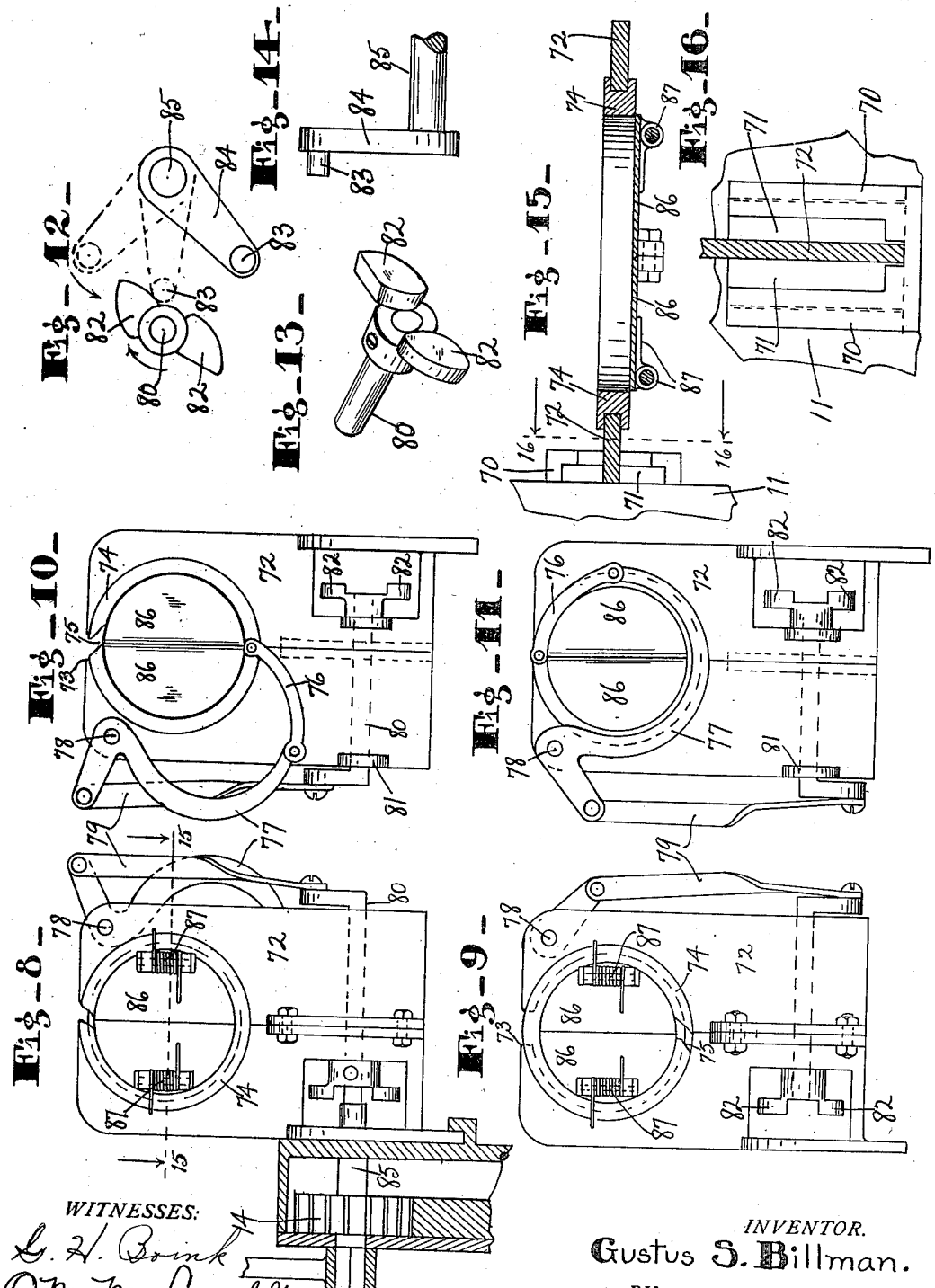

UNITED STATES PATENT OFFICE.

GUSTUS S. BILLMAN, OF SHELBYVILLE, INDIANA.

MACHINE FOR CLEANING INTESTINES.

997,738.

Specification of Letters Patent. Patented July 11, 1911.

Application filed October 8, 1910. Serial No. 585,942.

*To all whom it may concern:*

Be it known that I, GUSTUS S. BILLMAN, of Shelbyville, county of Shelby, and State of Indiana, have invented a certain useful Machine for Cleaning Intestines; and I do hereby declare that the following is a full, clear, and exact description thereof, reference being had to the accompanying drawings.

The object of this invention is to satisfactorily clean heavy beef intestines or like intestines which are more or less irregular in form, and is in the nature of an improvement over the devices set forth in my prior applications for intestine cleaning devices, Serial No. 545,541, filed Feb. 23, 1910, and Serial No. 572,988, filed July 21, 1910.

One feature of this invention is the provision of means for periodically turning the intestine a part of a revolution back and forth to enable the scraper to act on all parts of the intestine, and preferably to act a plurality of times on all parts thereof. In connection with the foregoing a novel knife or scraper construction is provided consisting of a pair of oppositely located knives or scrapers, or the like, which periodically come together so as to grasp the intestine between them and then give them a movement so as to clean the intestine on both sides simultaneously, while during the return movement the knives or scrapers are separated and the intestine turned.

Another feature of the invention consists in combining with the scraping device means for directing a jet of water against the knives or scrapers and the intestine being scraped. This is for the purpose of removing waste matter from the knives and intestine during the operation of the machine.

The nature of the invention will be understood from the accompanying drawings and the following description and claims.

In the drawings Figure 1 is a side elevation of the device showing the parts in the position occupied by them while the pair of knives are opened and having their return movement. Fig. 2 is a plan view of the left-hand portion of Fig. 1, the other portion being broken away. Fig. 3 is a plan view of the device while the knives in their closed position are substantially at their forward limit of movement. Fig. 4 is a section of a portion of the device on the line 4—4 of Fig. 2 with all parts omitted excepting the guide plates. Fig. 5 is a detail of the lower end of the rocker arm which operates in connection with said guide plate, the remainder of the arm being broken away. Fig. 6 is a front elevation of the knives in closed position, parts being broken away. Fig. 7 is a plan view of a portion of a mutilated driving gear, parts being partly broken away. Fig. 8 is a transverse section through the device on the line 8—8 of Fig. 3. Fig. 9 is the same as the right-hand portion of Fig. 8 with the scraping knives turned one-half revolution. Fig. 10 is an elevation of the opposite side of the right-hand portion of Fig. 8. Fig. 11 is an elevation of the opposite side of what is shown in Fig. 9. Figs. 12, 13 and 14 are detail figures illustrating the means for giving the holding and turning device its movements. Fig. 15 is a section on the line 15—15 of Fig. 8. Fig. 16 is a section on the line 16—16 of Fig. 15.

A standard 10 is adapted to be secured to a table or any other suitable means in fixed position, and a frame 11 is secured to the upper end of the standard by a connecting screw 12 so as to hold it rigid and yet enable the frame to be tilted at any desired angle. Said frame 11 carries a gear case 13, in which there is mounted a driving pinion 14, which is actuated by the crank 15 and carries a handle 16. The pinion 14 meshes with a large gear 17, which has a laterally extending cog segment 117, which meshes with a pinion 18 which drives the reel 19. This reel has a clamping spring 20 secured on it under which the intestine is slipped so as to be held on the reel. As the handle 14 is operated the intestine is reeled upon the reel 19. To the rear of the reel there is a table 25 which is on a level, substantially, with the upper part of the reel and over which the intestine may be drawn and upon which it may be scraped and cleaned. This table is secured at one side to the guide plate 26, which extends horizontally from the upper part of the frame 11 horizontally and rearwardly.

The scraping or knife construction is as follows: A horizontal bar 30 is secured to the guide plate 26 and spaced therefrom and the frame or carriage 31 embraces and slides upon the bar 30. It is given reciprocatory movement by the connecting bar 32, which is pivotally connected at one end to the carriage 31 and at the other end to the handle 16 or outer end of the crank 15. A rocking arm 35, bell-crank in shape, is between its ends pivotally mounted to the carriage 31 between the bars 26 and 30 by a pin 36, see Fig. 1, which is secured in the inner portion of the carriage 31 and projects through the hole 37 in the arm 35, see Fig. 5. The lower end of the bell crank or lever 35 has a roller 38 which projects laterally into the guideways formed in connection with the guide plate 26, see Fig. 4. This roller rides over the guide block 39 and under the flange 40. Hence there is a guideway between the block 39 and the flange 40, and the forward end of the guide block 39 is beveled on its underside and coöperates with a flange 41 forming a guideway at that end, and at the other end the block 39 is beveled on its upper edge to coöperate with the forked trip 45 to form the rear guideway. This forked trip is pivoted by the rod 46 in the guide bar 26 and is held in position by the arm 146, which is engaged by a spring 47, which is secured by the plate 26 for holding the trip in its normal position, as shown in Fig. 4. The upper fork of said trip normally extends spaced away from the guide block 39, while the lower fork normally stands close to the block 39; but the forward end of said lower fork is curved downwardly so that as the roller 38 moves rearwardly in the direction of the lower arrow in Fig. 4, it will ride between the block 39 and the lower fork of the trip 45 and throw said trip into the dotted line position until the roller passes the rear end of the guide block 39, whereupon the spring 47 throws the trip 45 upward into its normal position. Then the reverse movement of the carriage 31 causes the roller to travel forwardly in the direction of the upper arrow in Fig. 4 and over the block 39. The different positions of the roller 38 are indicated by dotted lines in Fig. 4. When the roller passes off the forward end of the guide block 39, the flange 41 guides it when it starts its rearward movement.

A metal tube 90 is secured on the plate 50 by the screw 51 passing through an ear 91 from the tube 90. One end of the tube projects into close proximity with the scraping knives 58 and just behind them so as to discharge water against them, and also to discharge water against the intestine being scraped by the knife, for the purpose of cleaning waste from the knives and the intestine during the operation of the machine. The water is supplied from any suitable source through the flexible tube 92. One of the scraping knives 58 has lugs 93 on the inner edge adapted to overlap the companion knife. The function of these lugs is to prevent the intestine from slipping up and down while being scraped and hold the intestine in place between the knives.

The function of the guide block 39 coöperating with the arm 35 is to hold said arm vertically while the roller is passing under the guide block 39, and, therefore, rearwardly, and to throw the upper part of the arm 35 at a backward inclination, as shown in Fig. 1, while the carriage and roller 38 are moving forwardly. The upper end of the arm 35 is bent or turned horizontally over the table to a position about midway of the table, and then it is turned forwardly, as shown in Fig. 1. The upper forwardly extending portion of the arm 35 carries the knife holding plate 50, said plate being secured at its rearward end by the screw 51, which passes through said plate and the block 52 into the arm 35. The forward end of said portion of the arm 35 is bifurcated and the end 53 extends down from the plate 50 between the divided portions of the bifurcated end of the arm 35, and is secured therein by the pin 54. The forward end of the plate 50 carries a head 55, which is secured thereto and provided with two laterally downwardly extending portions, and each portion is provided with a pair of ears 56 between which the shank 57 of a scraping knife 58 is pivoted by the downwardly turned end of a pin 59. The upper portion of the pin 59 is bent over the head 55, as shown in Fig. 2, and each of them pivotally connected to the connecting rods 60, and the two connecting rods extend rearwardly and upwardly to a pin 61 in the upwardly extending arm 62, which is secured to a shaft 63 mounted in a pair of ears 64 in the plate 50. The shaft 63 projects laterally over the table and at its outer end carries a spring arm 65 and a boss 66 is secured to the extreme end of the spring and in position to ride upon the guide bar 67 secured upon the flange 40 and at the lateral edge of the table 25. The upper surface of this guide bar 67 is substantially horizontal excepting at its forward end where it curves downwardly. A spring 68 is connected with the plate 50 at one end and with the upper end of the arm 62 at the other end so as to act on said arm in such a way as to hold it in its forward position and hold the spring arm 65 and boss 66 in a downward position. This spring is not necessary as the boss 66 tends to accomplish the same function, but it is more positive than said boss.

The operation of the scraping knife construction is as follows: When the carriage 31 is moved to its forward limit of movement and the arm 35 thrown to its vertical position, the upwardly forwardly extending portion thereof throws the forward part of the plate 50 and the knives downwardly, relative to the spring bar 65 and arm 62, and, therefore, the connecting rods 60 connected with the arm 62 pull rearwardly on the bent pins 59 of the knives and move them into the position shown in Fig. 3 so as to close the knives on the intestine. This position is maintained while the scraping apparatus moves rearwardly and thus scrapes both sides of the intestine simultaneously. In the rearward limit of movement of the arm 35 it is thrown backward to its inclined position, as shown in Fig. 1, and that throws the forward part of the plate 50 and the knives upwardly without any corresponding movement of the arm 62 and spring arm 65, and, therefore, the rod 60 will tend to push forward on the pin 59 to open the knives.

The intestine is held and turned partially to and fro by the following means: On the inner side of the frame 11 between the table and the reel a pocket bracket 70 is provided into which the plate 71 is adapted to be inserted downwardly and whereby it is held. This plate carries a vertically disposed plate 72, which has a large circular hole in it which cuts the top of the plate so as to leave an opening 73 for the insertion of the intestine. In said hole a split ring 74 has bearing, as shown in Fig. 15, the opening 75 in said ring being adapted to register at times with the opening 73 in the plate 72, so that the intestine can be inserted also in said ring and the ring will be oscillatory in the hole in the plate 72. Said ring 74 is oscillated by a connecting bar 76, which is pivoted thereto at one end, and by the lever 77, which is pivoted to the other end of the bar 76. The lever 77 is bell cranked with one arm curved substantially the same as one-half of the ring 74. Said lever is fulcrumed on the plate 72 by a pin 78, and the short arm of said lever is actuated by a connecting bar 79, which runs down to a crank on the crank shaft 80 having bearings on the two ears 81 extending from the plate 72. On the one end of said shaft 80 there is a pair of oppositely located cams with cam connections 82, see Figs. 12 and 13, in position to be engaged by the pin 83 on the crank 84 secured to the arbor 85 of the driving gear 14, see Fig. 3. Therefore, during each revolution of the handle 16 the pin 83 of the crank 84 engages one of the cams 82 and gives to the shaft 80, and, therefore, to the ring 74 a half revolution. A pair of semi-circular disks 86 are pivoted at opposite points to the ring 74, and there are springs 87 on the hinges of said disks to force them shut against the edge of the ring 74. Hence these disks will open toward the reel for the insertion of an intestine, but when inserted they will close against the intestine and hold it flat between them. Hence the reel can draw the intestine through the ring 74 and between the disks 86.

The machine permits an intestine to be held by the disks 86 flat and to be drawn intermittently and step by step between said disks by the reel, the disks having, however, the one function of holding the intestine flat and the disks are arranged in vertical positions like the scraping knives. Hence they will hold the intestine flat and vertical, in position to be grasped by the knives. The gearing and actuating means are so arranged that the stroke or movement of the knives will be about double the extent of operation of the reel. Hence every part of the intestine will be scraped at least twice, and at every operation of the knife carrying mechanism, but only during the return movement thereof, and thus turn the intestine a half revolution at each operation of the scraping means, whereby the same will be fully treated by the scraping knives.

I claim as my invention:

1. A machine for cleaning intestines including means for intermittently moving the intestine and holding it from longitudinal movement in one direction, and means reciprocable longitudinally of the intestine and provided with a plurality of oppositely located coöperating yielding scraping knives adapted to engage opposite sides of the intestine and scrape the same.

2. A machine for cleaning intestines including means for intermittently moving the intestine and holding it from longitudinal movement in one direction, means reciprocable longitudinally of the intestine for cleaning the same, and means for periodically giving said intestine holding means a half revolution.

3. A machine for cleaning intestines including means for intermittently moving the intestine and holding it from longitudinal movement in one direction, a pair of yieldingly mounted scraping knives adapted to engage the opposite sides of the intestine, means for giving said knives a reciprocatory movement toward and away from the intestine holding means, and means for separating said knives while moving toward said intestine holding means.

4. A machine for cleaning intestines including means for intermittently moving the intestine and holding it from longitudinal movement in one direction, a knife holding plate reciprocable toward and away from the intestine holding means, a pair of vertically disposed knives hinged to the forward end of said plate opposite each other so that their edges may meet, means for forcing said knives toward each other, means mounted in connection with said plate for causing the spreading movement of said knives, and a guide plate for actuating said means.

5. A machine for cleaning intestines including means for intermittently moving the intestine and holding it from longitudinal movement in one direction, a knife holding plate reciprocable toward and away from said holding means and having its forward end bifurcated with a pair of horizontal ears on each side thereof, pivot pins mounted in said ears with their ends bent horizontally toward each other, knives secured on the vertical portions of said pivot pins and having vertical edges adapted to meet, rods pivotally connected with the horizontal portions of said pivot pins and extending rearwardly, a bell crank lever mounted on said knife holding plate with one end thereof pivoted to said connecting bars, and a guide plate in connection with which the other end of said lever moves and whereby said lever is actuated for opening and closing said knives.

6. A machine for cleaning intestines including means for intermittently moving the intestine and holding it from longitudinal movement in one direction, a knife holding plate reciprocable toward and away from said holding means and having its forward end bifurcated with a pair of horizontal ears on each side thereof, pivot pins mounted in said ears with their ends bent horizontally toward each other, knives secured on the vertical portions of said pivot pins and having vertical edges adapted to meet, rods pivotally connected with the horizontal portions of said pivot pins and extending rearwardly, a bell crank lever mounted on said knife holding plate with one end thereof pivoted to said connecting bars, a guide plate in connection with which the other end of said lever moves and whereby said lever is actuated for opening and closing said knives, and means for altering the pitch of said knife holding plate in relation to said bell crank lever.

7. A machine for cleaning intestines including means for intermittently moving the intestine and holding it from longitudinal movement in one direction, a carriage slidable toward and away from said intestine holding means, an arm fulcrumed to said carriage between its ends with the upper end thereof provided with a transverse horizontal portion and a portion projecting therefrom toward the intestine holding means, a guide plate in connection with which the other end of said arm operates whereby when the carriage moves away from the intestine holding means the arm will be vertical and when moving toward the intestine holding means said arm will be inclined rearwardly and so that the forwardly extending portion of the same will be inclined downwardly, a knife holding plate secured to the forward portion of said arm and having its forward end bifurcated, pivot pins mounted in each side of the forward end of said plate and bent so as to have vertical and horizontal portions, a knife secured to the vertical portion of each of said pins, a connecting bar extending from the end of the horizontal portion of each pin rearwardly, a bell crank lever pivoted to said knife holding plate and with one end pivoted to said connecting bars and the other end extending downwardly, and a guide plate in connection with which the lower end of said bell crank lever operates and arranged so that when the knives approach the intestine holding means the lower end of the bell crank lever will be depressed so as to separate the knives and enable them to grasp the intestine on the two opposite sides thereof.

8. A machine for cleaning intestines including means for intermittently moving the intestine and holding it, reciprocable means for scraping the same, and means connected and movable with the scraping means for directing a jet of water against the scraping means and intestine while being scraped for removing waste therefrom.

9. A machine for cleaning intestines including means for intermittently moving the intestine and holding it from longitudinal movement in one direction, means reciprocable longitudinally of the intestine and provided with a plurality of oppositely located coöperating yielding scraping knives adapted to engage opposite sides of the intestine and scrape the same, and a water pipe mounted in connection with said means so as to discharge water against said knives.

10. A machine for cleaning intestines including a reciprocable scraping means, a vertical plate mounted in front of the scraping means and provided with a circular hole therethrough with an opening to the edge of the plate, a ring mounted in said hole so as to be oscillatory and with an opening through the ring to register with the opening in the plate at times and permit the insertion of an intestine, a pair of semi-circular disks spring-mounted on said ring with their edges meeting midway thereof for holding the intestine flat, and means for periodically giving said ring oscillatory movement.

11. A machine for cleaning intestines including a reciprocable scraping means, a vertical plate mounted in front of the scraping means and provided with a circular hole therethrough with an opening to the edge of the plate, a ring mounted in said hole so as to be oscillatory and with an opening through the ring to register with the opening in the plate at times and permit the insertion of an intestine, a pair of semi-circular disks spring-mounted on said ring with their edges meeting midway thereof for holding the intestine flat, and means for periodically giving said ring a half revolution back and forth.

12. A machine for cleaning intestines including a reciprocable scraping means, a vertical plate mounted in front of the scraping means and provided with a circular hole therethrough with an opening to the edge of the plate, a ring mounted in said hole so as to be oscillatory and with an opening through the ring to register with the opening in the plate at times and permit the insertion of an intestine, a pair of semi-circular disks spring-mounted on said ring with their edges meeting midway thereof for holding the intestine flat, a connecting rod pivoted at one end of said ring, a bell crank lever pivoted between its ends on said plate and having a semi-circular ring pivoted to said connecting rod, a connecting bar pivoted to the other end of said lever, a shaft provided with a crank on one end to which said last-mentioned connecting bar is pivoted, a pair of oppositely extending cam projections on the other end of said shaft, and a constantly rotating shaft provided with a crank having a pin adapted at each revolution of said shaft to engage one of said cam projections, whereby periodical half-revolutions will be given to said ring back and forth during the operation of the machine.

13. A machine for cleaning intestines including means for intermittently moving the intestine and holding it from longitudinal movement in one direction, means reciprocable longitudinally of the intestine and provided with a plurality of oppositely located coöperating yielding scraping knives adapted to engage opposite sides of the intestines and scrape the same, means for periodically giving said intestine holding means a half revolution, and a single means for operating both the scraping means and intestine holding means, whereby the intestine holding means will be given a half revolution while the scraping means is approaching the intestine holding means.

14. A machine for cleaning intestines including means for intermittently moving the intestine and holding it from longitudinal movement in one direction, a pair of yieldingly mounted scraping knives adapted to engage the opposite sides of the intestine, means for giving said knives a reciprocatory movement toward and away from the intestine holding means, means for separating said knives while moving toward said intestine holding means, and a single means for operating both the scraping means and intestine holding means, whereby the intestine holding means will be given a half revolution while the scraping means is approaching the intestine holding means.

15. A machine for cleaning intestines including means for intermittently moving the intestine and holding it from longitudinal movement in one direction, means reciprocable longitudinally of the intestine for cleaning the same, and means for giving said intestine holding means revoluble movement alternately in opposite directions.

In witness whereof, I have hereunto affixed my signature in the presence of the witnesses herein named.

GUSTUS S. BILLMAN.

Witnesses:
G. H. BOINK,
J. H. WELLS.